United States Patent
Florence

(10) Patent No.: US 7,434,246 B2
(45) Date of Patent: Oct. 7, 2008

(54) SYSTEMS AND METHODS FOR AUTOMATIC PERSONALIZING OF CHANNEL FAVORITES IN A SET TOP BOX

(75) Inventor: Michael Florence, North Bend, WA (US)

(73) Assignee: Digeo, Inc., Kirkland, WA (US)

( * ) Notice: Subject to any disclaimer, the term of this patent is extended or adjusted under 35 U.S.C. 154(b) by 1139 days.

(21) Appl. No.: 09/877,549

(22) Filed: Jun. 8, 2001

(65) Prior Publication Data

US 2002/0188948 A1    Dec. 12, 2002

(51) Int. Cl.
*H04N 5/445* (2006.01)
*G06F 3/00* (2006.01)
*G06F 13/00* (2006.01)

(52) U.S. Cl. .............................. 725/46; 725/47; 725/52; 725/61; 725/13; 725/14; 725/44; 725/45

(58) Field of Classification Search ............. 725/44–47, 725/13–14
See application file for complete search history.

(56) References Cited

U.S. PATENT DOCUMENTS

| | | | | |
|---|---|---|---|---|
| 5,801,747 A | * | 9/1998 | Bedard | 725/46 |
| 5,808,614 A | | 9/1998 | Nagahara et al. | 345/355 |
| 5,819,156 A | * | 10/1998 | Belmont | 725/14 |
| 5,977,964 A | | 11/1999 | Williams et al. | 345/327 |
| 6,177,931 B1 | * | 1/2001 | Alexander et al. | 725/52 |
| 6,337,715 B1 | | 1/2002 | Inagaki et al. | 348/553 |
| 7,152,236 B1 | * | 12/2006 | Wugofski et al. | 725/40 |
| 7,240,355 B1 | * | 7/2007 | Eldering et al. | 725/46 |
| 2002/0104081 A1 | * | 8/2002 | Candelore et al. | 725/9 |

\* cited by examiner

*Primary Examiner*—Jason P Salce
(74) *Attorney, Agent, or Firm*—Kory D. Christensen; Stoel Rives LLP

(57) ABSTRACT

A set top box for use in interactive television systems includes a generation engine and a display engine. The generation engine automatically stores channel favorites in a channel favorites table. The generation engine may include cumulative viewing time for each channel in the table as well as the number of times each channel in the table has been viewed. The display engine, upon request, displays a list of channels in the channel favorites tables according to a viewer order preference.

19 Claims, 13 Drawing Sheets

Channel Favorites Table

| Table 400 | Table 440 |
|---|---|
| James (401) | Bill (441) |
| Numeric (402) | Time (442) |
| ABC (403) | ABC (443) |
| 2 (404) | 2 (444) |
| 20:43 (405) | 1:21 (445) |
| 40 (406) | 2 (446) |
| NBC (407) | CBS (447) |
| 4 (408) | 7 (448) |
| 2:43 (409) | 20:10 (449) |
| 2 (410) | 38 (450) |
| CBS (411) | MTV (451) |
| 7 (412) | 43 (452) |
| 90:21 (413) | 50:21 (453) |
| 700 (414) | 60 (454) |
| CNN (415) | |
| 53 (416) | |
| 20:21 (417) | |
| 500 (418) | |

365b

Channel Favorites Table

| Table 400 | Table 440 |
|---|---|
| James (401) | Bill (441) |
| Numeric (402) | Time (442) |
| ABC (403) | ABC (443) |
| 2 (404) | 2 (444) |
| 20:43 (405) | 1:21 (445) |
| 40 (406) | 2 (446) |
| NBC (407) | CBS (447) |
| 4 (408) | 7 (448) |
| 2:43 (409) | 20:10 (449) |
| 2 (410) | 38 (450) |
| CBS (411) | MTV (451) |
| 7 (412) | 43 (452) |
| 90:21 (413) | 50:21 (453) |
| 700 (414) | 60 (454) |
| CNN (415) | |
| 53 (416) | |
| 20:21 (417) | |
| 500 (418) | |

SYSTEMS AND METHODS FOR AUTOMATIC PERSONALIZING OF CHANNEL FAVORITES IN A SET TOP BOX

TECHNICAL FIELD

This disclosure relates generally to set top boxes, and more particularly but not exclusively, to techniques for personalizing automatic channel favorites in a set top box.

BACKGROUND

Conventionally, set top boxes ("STBs") include a channel favorites feature that enables a viewer of an STB-equipped television to create and store a table of channel favorites. The viewer creates the table using multiple programming commands to store channel numbers in the channel favorites table of the STB. The viewer may also edit the channel favorites table by use of multiple programming commands.

The use of multiple programming commands to create or edit a channel favorites table makes programming a channel favorites table complicated and time-consuming. Further, the channel favorites table may need to be edited frequently and the editing may be even more complicated than originally programming the channel favorites table, because changing channel lineups and/or changing tastes of the viewer must be constantly reflected in the content of the channel favorites table. Thus, the conventional channel favorites feature in STBs is not popular with or widely used by STB users because of the manual actions and complicated programming procedures that are required from users.

Accordingly, improved techniques for generating channel favorites tables are very desirable.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4B is a block diagram of example channel favorites tables within memory of the STB of FIG. 3;

DETAILED DESCRIPTION OF THE ILLUSTRATED EMBODIMENTS

Figure 1:
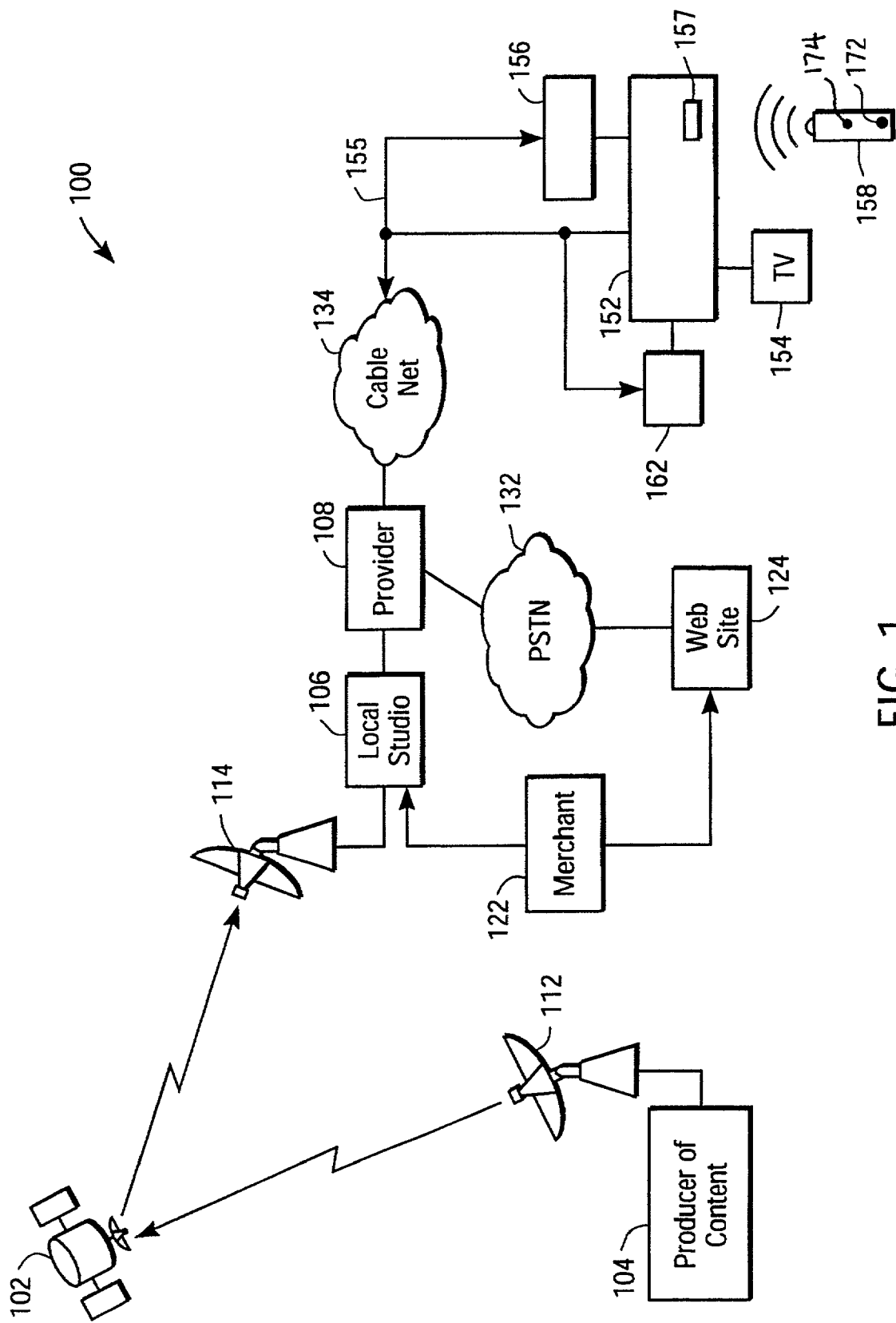
FIG. 1 is a block diagram of an interactive video casting system that can implement an embodiment of the invention.

The present invention provides techniques for automatically personalizing channel favorite tables in a set top box ("STB"). As an overview, in an embodiment, there is provided a channel favorites generation engine capable of automatically generating a channel favorites table for a viewer. In another embodiment, the generation engine is capable of automatically generating distinct channel favorites tables for each STB user. A display engine can display the channel favorites table on a display device (e.g., a television) coupled to the STB where the table lists favorite channels according to a preference set by the user. For example, the channel favorites table can be displayed using an ordering based on the cumulative time each channel was viewed. Alternatively, the channel favorites table may be displayed using an ordering based on the cumulative number of times each channel was watched.

In an embodiment of the invention, a channel favorites generation engine monitors an Electronic Program Guide ("EPG") in the STB that is used to change channels in order to generate the channel favorites table. When a viewer uses the EPG to change to a new channel from a prior channel, the generation engine stores the prior channel number and length of time that the prior channel was viewed in a channel favorites table. In addition, the generation engine may increment a counter in the channel favorites table to indicate that the prior channel was viewed an additional time.

In order to display the channel favorites table, a display engine determines a viewer preference for viewing the channel favorites table based on the viewer's preference stored in the channel favorites table. Then, the display engine orders the content of the channel favorites table according to the viewer's preference and outputs the channel favorites table to a display device, such as a television.

In the description herein, numerous specific details are provided, such as the description of system components in FIGS. 1 through 14, to provide a thorough understanding of embodiments of the invention. One skilled in the relevant art will recognize, however, that the invention can be practiced without one or more of the specific details, or with other systems, methods, components, materials, parts, and the like. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 is a block diagram of an example arrangement of an interactive video casting system 100 that can implement an embodiment of the invention. A production company 104 produces programming content for transmission to viewers. The transmission is sent via satellite transmission transceiver 112 over an uplink channel to a satellite 102. The satellite 102 then transmits the programming content over a downlink channel to a local studio 106. The local studio 106 can insert additional programming (e.g., regional programming) and/or advertisements as needed into the programming content. The content with the insertions is then transmitted from the local studio 106 via a satellite transmission transceiver 114 to a cable service provider 108. The television program may be downloaded to a receiving station, such as a head-end (H/E) (not shown) of the cable service provider 108, rather than or in addition to the local studio 106. A reverse channel from the cable service provider 108 to the local studio 106 is provided so that the local studio 106 can insert additional programming content and feed the television signal back to the cable service provider 108. The cable service provider 108 then delivers the television signal over a cable network 134 to cable subscribers.

The cable network 134 is provided by the cable service provider 108 to distribute the programming content to cable subscribers. A set top box (STB) 152, typically located on the premises of a cable television subscriber, receives the programming content or television signal from cable net 134, and delivers the television signal to the subscriber's television set 154. In some specific embodiments, alternatively or in addition, the television signal can be broadcast over a wireless medium and received by a traditional aerial antenna or by a satellite dish, and then delivered to the set top box 152. Alternatively or additionally, features and functionality of the set top box 152 may be integrated into a type of advanced television or other display device.

Moreover, embodiments of the invention can use other types of broadcast media, including but not limited to, digital cable systems, satellite, very-high-data-rate digital subscriber line (VDSL), web casts, and the like. The features provided by the television set 154 can also be provisioned, in one embodiment, by a personal computer (PC) suitably configured with an adapter to convert television signals into a digitized format, and then to deliver the television signals to the video portion of the computer for display. It is noted that the invention is not limited to any one configuration of display hardware as embodiments of the invention can be realized using alternative reception and display arrangements, as known to those skilled in the art.

In accordance with an embodiment of the invention, a connection to a communication network is provided for the cable subscriber. In one embodiment, the connection can be made via a cable modem 156 over a bi-directional communication link 155 to a cable modem termination system within the cable provider's 108 equipment. The connection continues to a data communication network, such as the Internet, by way of a public switched telephone network (PSTN) 132. The PSTN network 132 is provided herein as an example, and it is understood that other types of networks may be used for connectivity to the Internet. A cable modem arrangement can be used because of its high bandwidth capability. In situations where some cable companies are not equipped to provide cable modem service to their customers, various other arrangements can be made. For example, a conventional modem connection can be used to access the Internet over a telephone line. As another example, Internet access can be gained over a DSL connection or an integrated services digital network (ISDN) connection using a telephone line. Wireless systems are also available for providing Internet access. In one embodiment, downstream data transmission may occur via cable or satellite, and upstream data transmission may occur via a telephone line.

It is noted that the Internet is chosen as an example of a data communication network because it is a well-established network, and connectivity to the Internet is easily made. However, it is noted that a global communication network, such as the Internet, is not required to practice other embodiments of the invention. A locally provided and maintained communication network may be used in an embodiment of the invention.

Continuing with FIG. 1, the set top box 152 can include a transceiver 157, such as an infrared (IR) or radio frequency (RF) transceiver, that can exchange signals with a remote control unit 158 or other user input device. The set top box 152 can be a component that is separate from the television set 154 as shown in FIG. 1, or its features can be built into circuitry of the television set 154 (e.g., an interactive television set). The set top box 152 enables a viewer to select a television program to view and then delivers the television program to the television set 154. A storage unit 162 can also be coupled to or be a part of the set top box 152. The storage unit 162 can include a machine-readable storage medium such as a cache, buffer, memory, diskette, compact disk, tape, or the like and their associated hardware, in one embodiment. In another embodiment the storage unit 162 can include a video cassette recorder (VCR). In another embodiment, the storage unit can include a hard disk such as a digital or personal video recorder (DVR or PVR).

As noted above, the local studio 106 can insert additional programming into the received transmission, for example, to provide cable content that includes locally provided channels. The programming is then distributed to customers over the cable network 134. In addition to local program insertion, the local studio 106 can insert advertising content. Product supplemental information relating to the advertising for participating merchants 122 can also be inserted. Product supplemental information can include information relating to the goods or services being advertised in the commercial. In addition to goods and services, coupons and other information services can be made available to the viewer, which in one embodiment can be obtained via the merchant's 122 web site 124 on the Internet. Triggers, such as Advanced Television Enhancement Forum (ATVEF) triggers, which are related to the web site 124 and/or to its contents, can be continuously updated as the television broadcast is being received.

Figure 2:
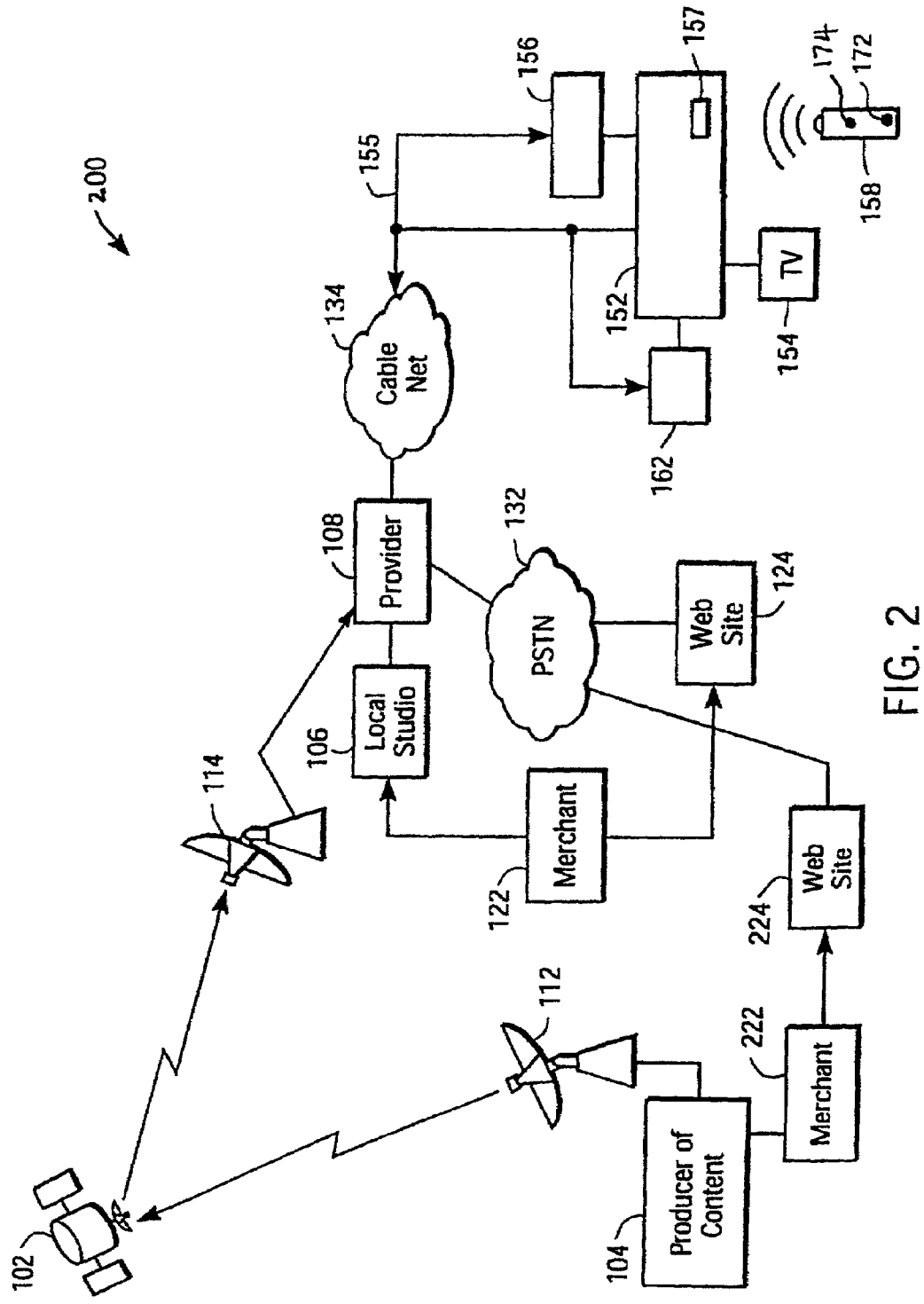
FIG. 2 is a block diagram of another interactive video casting system that can implement an embodiment of the invention.

As noted above, the triggers, resources, or announcements can be inserted by the originating broadcaster 104, a local broadcaster 106, or by the cable system operator 108. FIG. 2 is another block diagram showing an example of an interactive video casting system 200 and illustrates another point of insertion of the product supplemental information. Here, a merchant 222, operating a web site 224, is located such that merchant 222 is capable of inserting commercial prior to the uplink transmission to the satellite 102.

As noted above, Internet access is not necessary to practice the invention. A locally provided network may be within the scope of the invention as claimed. The cable provider 108 can supply the foregoing features, for example, by providing a web site or "walled garden" that is accessed by its subscribers. In such a case, the cable provider 108 serves as an intermediary and submits the purchases to the actual merchants 122 or 222.

Figure 3:
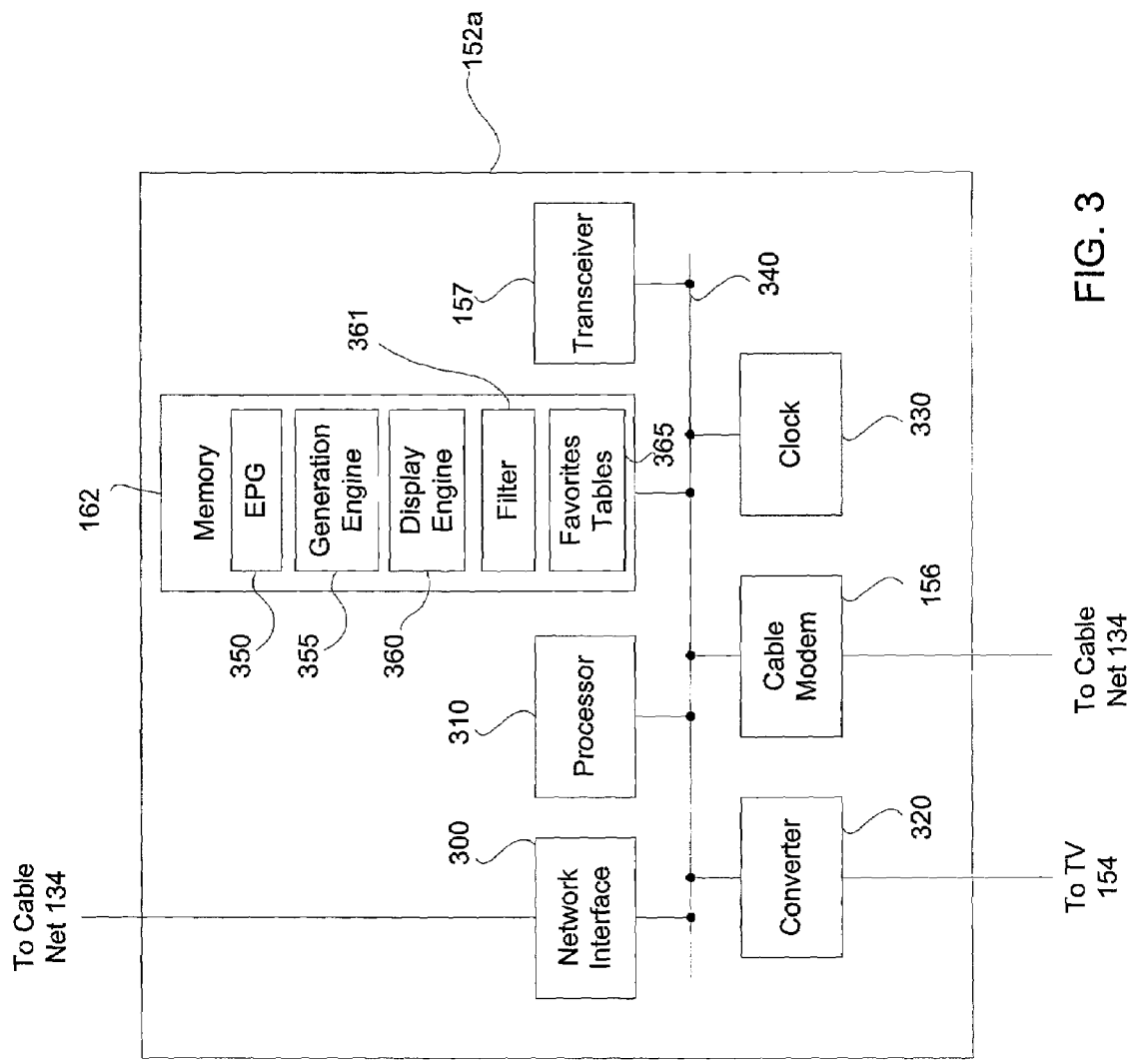
FIG. 3 is a block diagram of a set top box (STB) according to an embodiment of the invention.

FIG. 3 illustrates a block diagram of a representative set top box according to an embodiment of the invention. It is noted that the STBs 152a and 152b described below are some of the possible embodiments of the STB 152 that are shown in FIG. 1 or FIG. 2. The STB 152a includes a network interface 300, processor 310, memory device 162 (also referred to as a storage device), transceiver 157, converter 320, cable modem 156, and clock 330, all interconnected together for communication via system bus 340. Network interface 300 connects the STB 152a to the cable network 134 (FIG. 1). In alternative embodiments, the cable modem 156 or the converter 320 may provide some or all of the functionality of the network interface 300, and thus, the cable modem 156 and/or converter 320 may be omitted. In other embodiments, the network interface 300 may also provide some or all of the functionalities of the converter 320 and cable modem 156, and as a result, the converter 320 and cable modem 156 may be omitted in these particular embodiments. Processor (controller) 310 executes instructions stored in memory 162, specifically, generation engine 355, which generates a channel favorites table, and display engine 360, which displays the channel favorites table per a viewer's preference. Processor 310 also manages other functions of the STB 152a.

In one embodiment, the memory 162 stores an Electronic Program Guide ("EPG") 350, the generation engine 355, the display engine 360, and favorites tables 365. The EPG 350 is typically a guide that allows a viewer to view channel schedules and then select a channel for viewing. The processor 310 monitors the EPG 350 to determine if the STB 152a is on or off, and if a channel change had occurred. Typically, the EPG 350 would change the tuned channel in response to a channel change command and would emit a notification that is detected by the processor 310. Thus, the processor 310 is able to track any occurring channel change. In one embodiment, a filter engine 361 filters the channel change events, as described below. In one embodiment, the filter engine 361 determines if a channel change event is a valid event. For example, if the user selects a channel "11" and only view the channel "11" for less than twenty (20) seconds, then the filter engine 361 will consider this channel selection event as invalid, since this event may indicate that the user is simply channel surfing the channel "11". Thus, information relating to the selection of channel "11" will typically not be stored in one of the channel favorites table. On the other hand, if the filter engine 361 determines a channel selection event as valid, then information related to the valid event is stored in one of the channel favorites table 365.

The generation engine 355 generates a channel favorites table, which is stored in the favorites tables 365, based on a viewer changing channels using the EPG 350.

The generation engine 355 also updates the channel favorites table in the favorites tables 365 based on the viewer's channel viewing habits using the EPG 350. An embodiment of the generation engine 355 will be discussed in further detail in conjunction with FIG. 5.

Display engine 360, according to one embodiment of the invention, displays a channel favorites table from favorites tables 365 on TV 154 or other display device. The channel favorites table can be displayed in different orders, according to a viewer's preference. For example, in various specific embodiments, the channel favorites table can be displayed according to a numerical channel order, based on a cumulative viewing time per channel, based on a frequency of viewing per channel, or based on other orders. An embodiment of display engine 360 will be discussed in further detail in conjunction with FIG. 6.

The EPG 350, generation engine 355, filter 361, and/or display engine 360 may each be implemented as a program module, instructions, or the like.

In an embodiment, favorites tables 365 includes one channel favorites table for a single viewer. In an alternative embodiment, the favorites tables 365 may include multiple channel favorites tables. Accordingly, multiple viewers may each have his or her own channel favorites table in a single STB. Favorites tables 365 are generated and updated by generation engine 355. Contents of the favorites tables 365 may be displayed by display engine 360. An embodiment of favorites tables 365 will be discussed in further detail in conjunction with FIG. 4.

Figure 8:
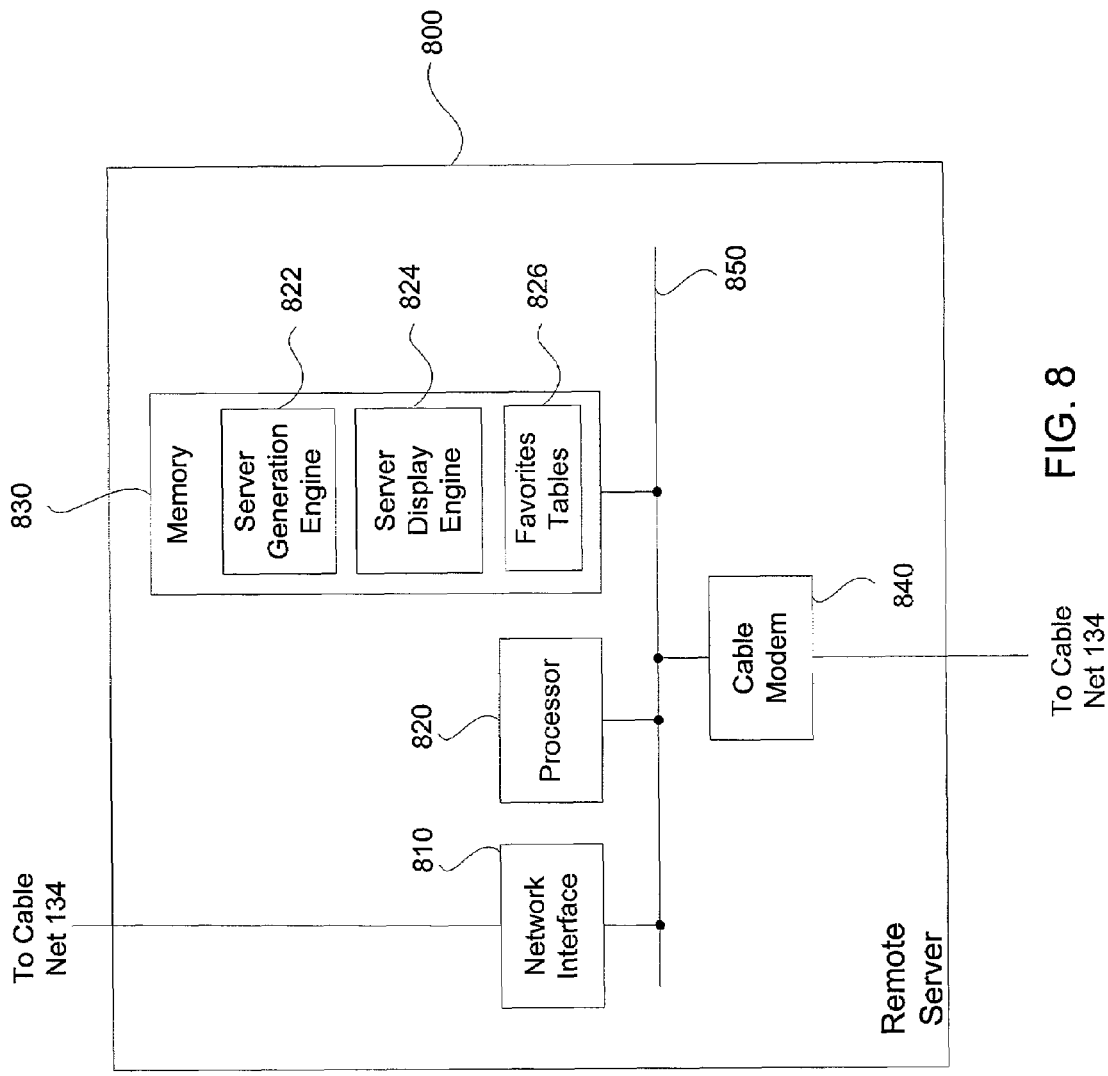
FIG. 8 is a block diagram of server for use with the STB of FIG. 7.

In one embodiment, the information in a favorites table is stored in a cookie in a memory of STB 152a. As known to those skilled in the art, cookies are typically data files that contain various information. As discussed below, in another embodiment, the information in a favorites table is stored in memory in a remote server 800 (FIG. 8).

Transceiver 157 can include an IR or RF transceiver that can exchange signals with a remote control unit 158 (FIG. 1 or FIG. 2) or other user input device. Converter 320 can convert, if necessary, digitally encoded broadcasts to a format usable by TV 154 (FIG. 1 or FIG. 2). In addition, converter 320 can convert other data received in an out-of-band portion of a broadcast, such as television scheduling information to a format that can be stored in memory 162.

Cable modem 156 can transmit and receive digital information, such as television scheduling information, if not included in the out-of-band portion of a broadcast. In alternative embodiments, cable modem 156 may be a conventional modem for use over telephone lines or may include any other components or modules for transmitting and receiving digital data.

Clock 330 is typically a digital clock for use with the generation engine 355. The generation engine 355 determines an amount of time that a channel has been viewed as measured by using time from clock 330. The clock 330 can be updated regularly by using cable modem 156 to contact an online clock, such as the Atomic Clock at the U.S. Naval Observatory, or to contact a head end at the provider 108 so that the clock 330 is synchronized with the clock of provider 108, or other methods. Alternatively, the clock 330 may be set manually by a viewer or may be updated through other methods.

Figure 4A:
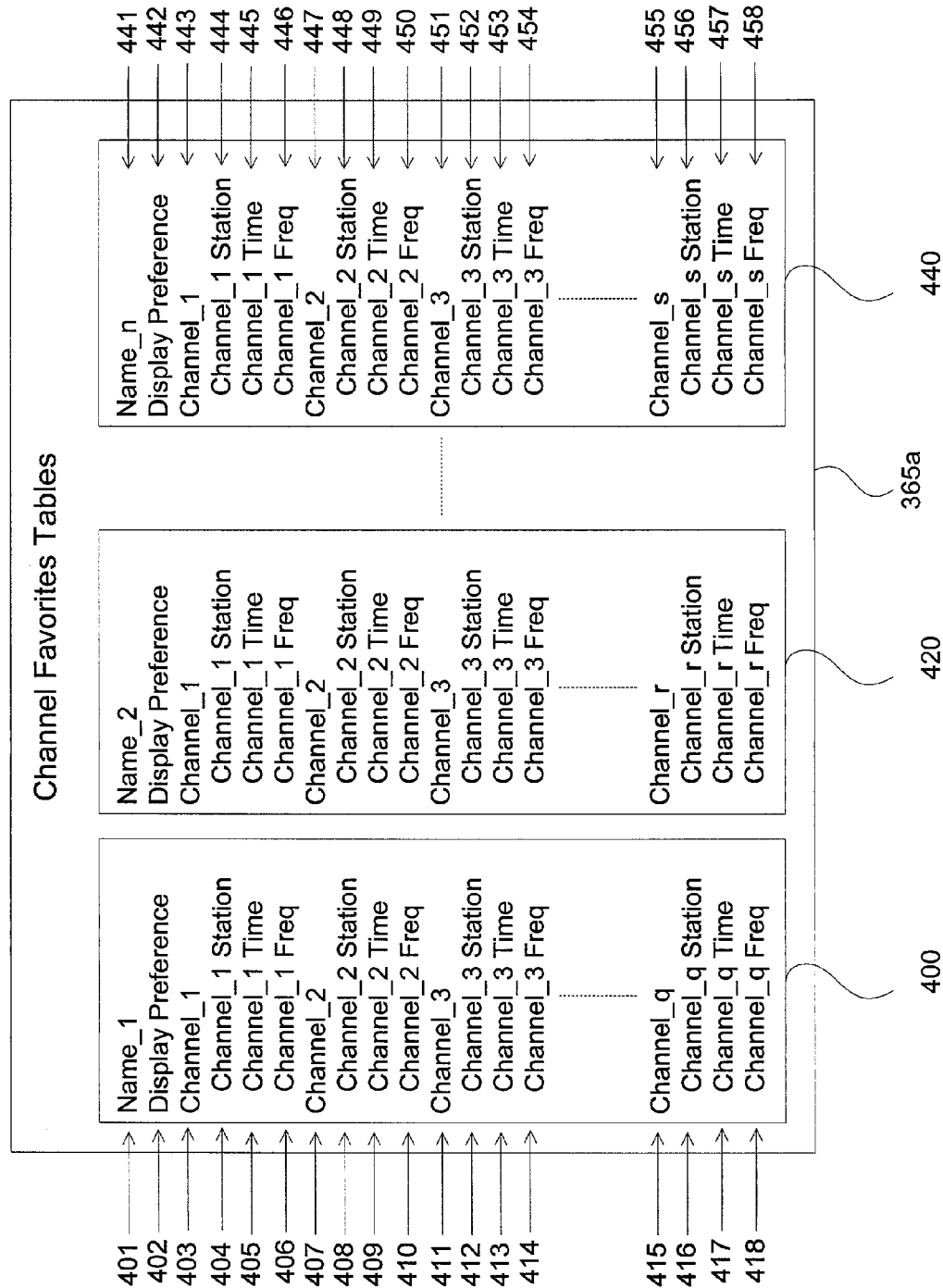
FIG. 4A is a block diagram of example channel favorites tables within memory of the STB of FIG. 3.

FIG. 4A illustrates a diagram of an example channel favorites tables 365a within memory 162 (FIG. 3). Favorites tables 365a may include an n number of distinct channel favorites tables where n is an integer value. Favorites tables 365a can hold any number n of favorites tables as permitted by available memory. However, favorites tables 365a will typically include up to a number of distinct tables equal to the number of viewers of TV 154 (FIG. 1). For example, if there is only one regular viewer of TV 154, then n may be set equal to one (1), and thus favorites tables 365a would include a single table 400.

In the example favorites tables 365a of FIG. 4A, n=3, and therefore favorites tables 365a includes three favorites tables: table 400, table 420, and table 440. Table 400, 420, and 440 each store a name (Name_1, Name_2, ... Name_n) or other identification of a viewer, a display preference for the viewer, and an automatically generated channel favorites table. The display preference possibilities include numerical order, frequency of channel viewing order, cumulative time of channel viewing, or other orders. In one embodiment, for each channel in the channel favorites table, the following information may be stored: a channel station number, cumulative viewing time over a predefined time, and/or frequency of the viewing over a predefined time. For example, table 400 stores a viewer name (Name_1) 401, a display preference 402, and data for a q number of channels where q is an integer value. Channel_1 403 includes a Channel_1 station number 404, a Channel_1 time 405, which is the cumulative time that the viewer has watched Channel_1, and Channel_1 frequency 406 is the number of times that the viewer has watched Channel_1. Channel_2 407 holds similar information as described above for Channel_1 403. Tables 420 and 440 hold similar data for an r number and an s number of channels respectively, where r and s are integer values. The number of channels in each table may be equal each other or may vary. The number of channels in each table is only limited by the amount of memory available in memory 162 for storing the favorites tables 365. In other embodiments, the favorites tables 365*a* may be stored in another memory device in STB 152*a* where the memory device is accessible by processor 310. In another embodiment, the favorites tables 365*a* may be stored in the storage unit 162 (FIG. 1) if the processor 310 is capable of communicating with the storage unit 162.

FIG. 4B illustrates a diagram of an example channel favorites tables 365*b* within memory 162 (FIG. 3). As with the favorites tables 365*a*, the favorites tables 365*b* may be stored in another memory device that is accessible by processor 310. Table 400 in FIG. 4B, stores four channel favorites for viewer James 401. The names of the channels are ABC (403), NBC (407), CBS (411), and CNN (415). For each channel, the channel number, cumulative time the channel has been watched, and the number of times the channel has been watched are stored in table 400. For example, CNN (415) appears on channel 53 (416). Viewer James 401 has watched CNN (415) 500 times (418) for a cumulative time of 20 hours and 21 minutes (417). In addition, the display preference 402, in this case numeric order, is also stored in table 400. Note that the display preference can be stored in alphanumeric characters as in the example above, in a bit value representing the preference, or using any of a variety of suitable techniques.

Figure 5:
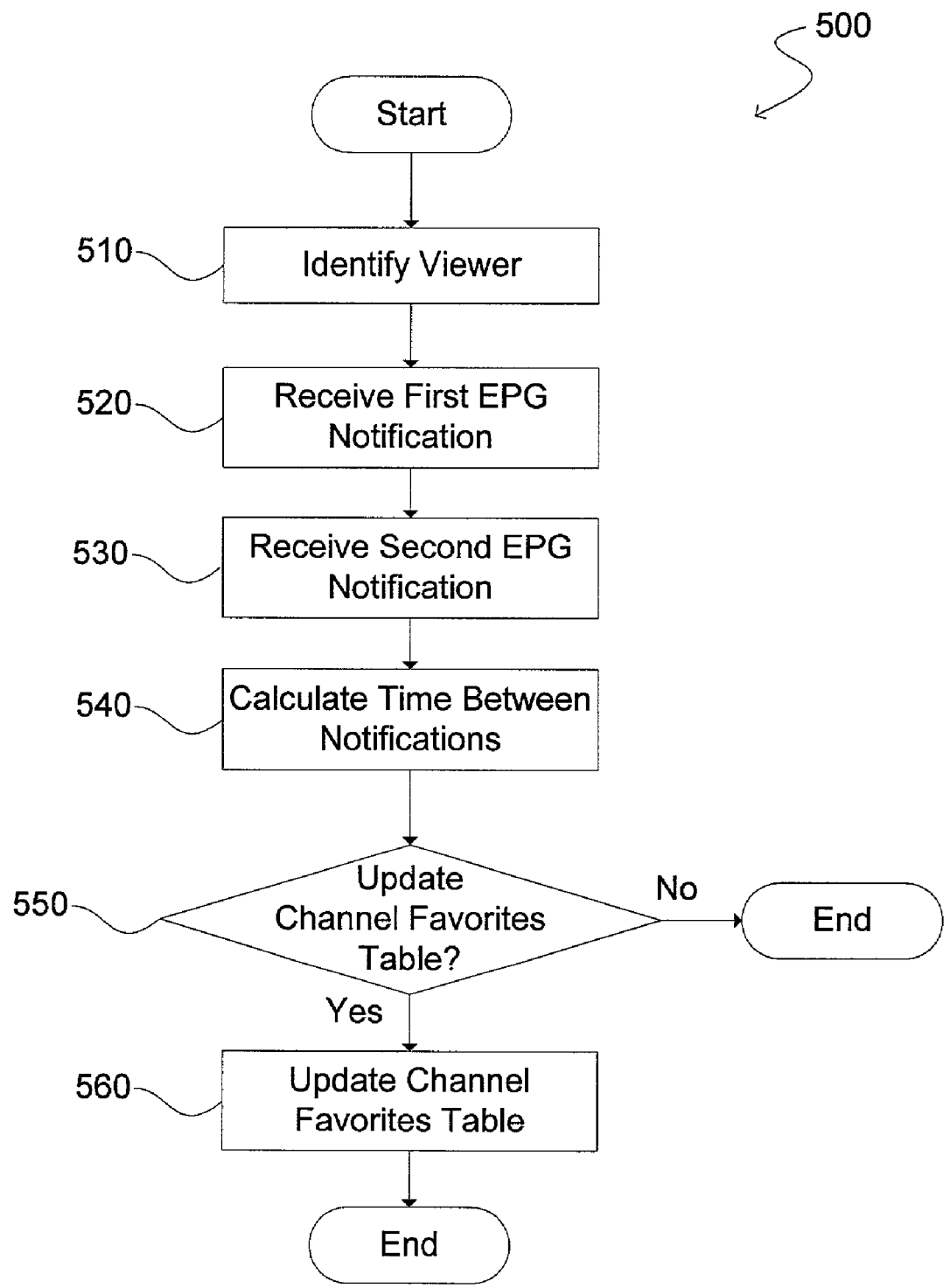
FIG. 5 is a flowchart diagram of a method for generating a channel favorites table according to an embodiment of the invention.

FIG. 5 illustrates a flowchart diagram 500 of a representative process for generating a channel favorites table (e.g., table 400 in FIG. 3). In an embodiment, the processing depicted by flowchart diagram 500 can execute continuously or at representative intervals to update channel favorites table 400. The identity of the viewer is determined (510) by prompting the viewer to enter his or her name or by using any of various automatic identification techniques. The determination can be done, for example, by generation engine 355 (FIG. 3). Next, a first channel activity notification, such as an electronic program guide (EPG) notification is received (520) from, for example, EPG 350, thereby indicating an activity, such as channel selection and/or viewing. The first notification can be received, for example, by generation engine 355, which will also make a note of the time of receiving the first notification. A second channel activity notification then received (530) by, for example, generation engine 355. The second notification indicates that the viewer has changed channels, i.e., a channel change event has occurred. The time difference between the two notifications is then calculated (540). In one embodiment, the generation engine 355 performs the time difference calculation.

The channel change event is then filtered (550) to determine whether the channel favorites table should be updated. In one embodiment, filtering is based on the time difference calculation value. In one embodiment, if the time difference calculation value is less than a specified amount, for example ten (10) seconds, which may indicate channel surfing, not a bona fide viewing time, then the channel change event is ignored, and processing illustrated by flowchart diagram 500 then ends. Otherwise the channel favorites table is updated (560). The filtering (550) may be performed by, for example, the filtering engine 361 (FIG. 3).

If the channel change event passes the filtering function (550), then the channel change event is deemed to be significant and the channel favorites table 400 is updated (560) to reflect the channel change event. In an alternative embodiment, the viewer may first be prompted as to whether he or she wants the favorites table updated based on the change channel event. If authorization is received, the channel favorites table 400 would be updated (560). Prompting may be performed by, for example, filtering engine 361.

Updating the table 400 can include storing one or more of the channel name, channel number, time the channel was viewed, and incrementing a counter indicating the number of times the channel was viewed. Alternatively, if the channel is already in the favorites table 400, then the table 400 is updated by adding the amount of time the channel was viewed to the cumulative time for that channel and incrementing the frequency counter for that channel by one. In one embodiment, the generation engine 355 performs the updating (560). For example, if a viewer watched CBS for 20 minutes, then, in table 400 of tables 365*b* (FIG. 4*b*), cumulative time 413 for CBS (411) would be updated to 90:41 and frequency counter 414 for CBS (411) would be updated to 701.

Figure 6:
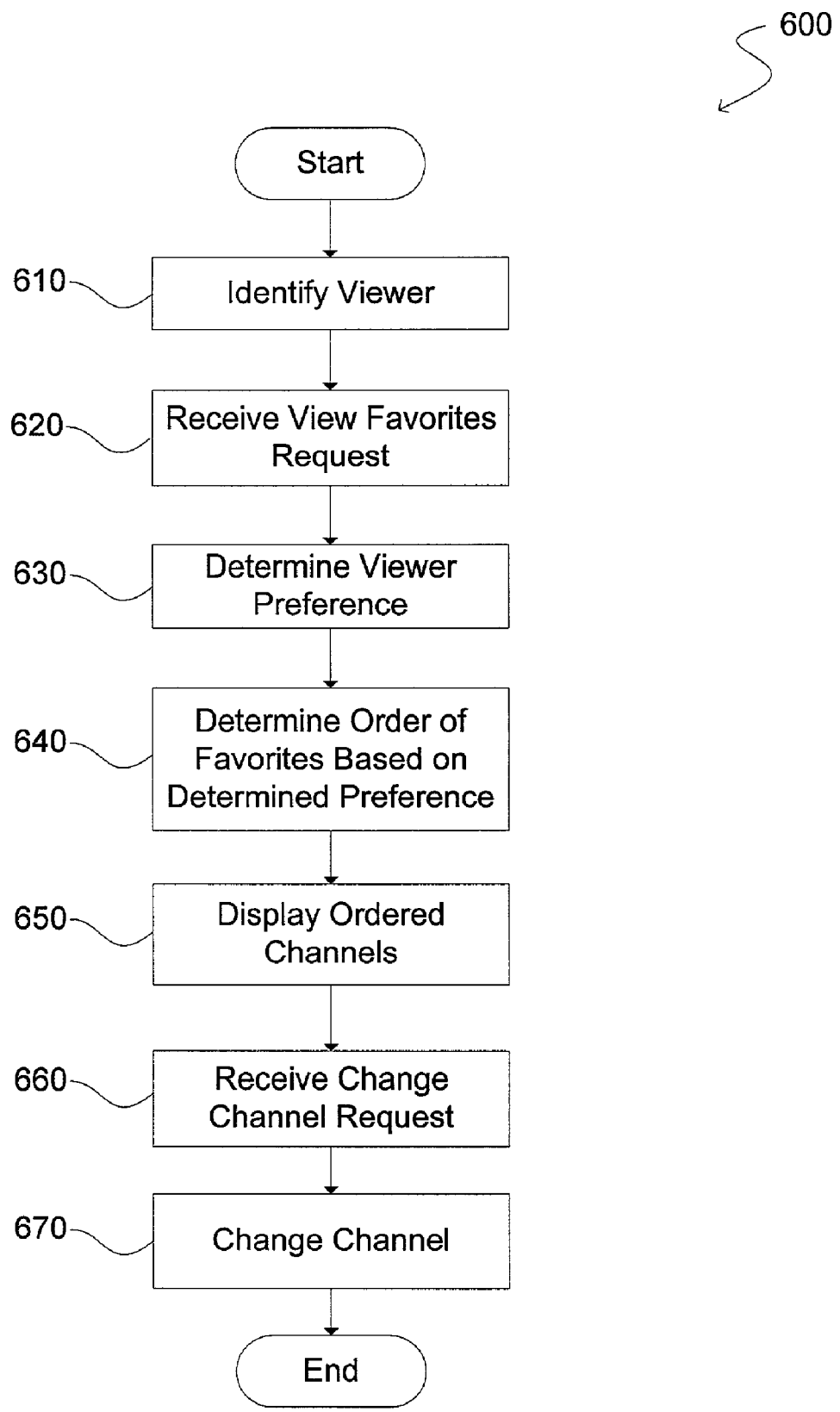
FIG. 6 is a flowchart diagram of a method for displaying a channel favorites table according to an embodiment of the invention.

FIG. 6 illustrates a flowchart diagram 600 of representative processing for displaying a channel favorites table in an embodiment according to the present invention. The display engine 360 may perform the processing illustrated by flowchart diagram 600. First, a viewer is identified (610) by prompting the viewer for his or her name or by using any of a variety of automated techniques. Next, a view favorites request is received (620). Based on the viewer identification, the viewer's display preference is determined (630). For example, in table 400 of tables 365*b* (FIG. 4B), user Bill's display preference 442 is listed by cumulative time. Accordingly, Bill's preference is to display his channel favorites based on which channels he has watched the most based on cumulative time. Next, the channel favorites order is determined (640) based on the determined viewer display preference.

The ordered channel favorites are then displayed (650) on TV 154. Based on the displayed favorites, the viewer may then request to change channels. If a channel change request is received (660) then the channel is changed (670) per the viewer's request, and processing illustrated by flowchart diagram 600 is completed.

Figure 7:
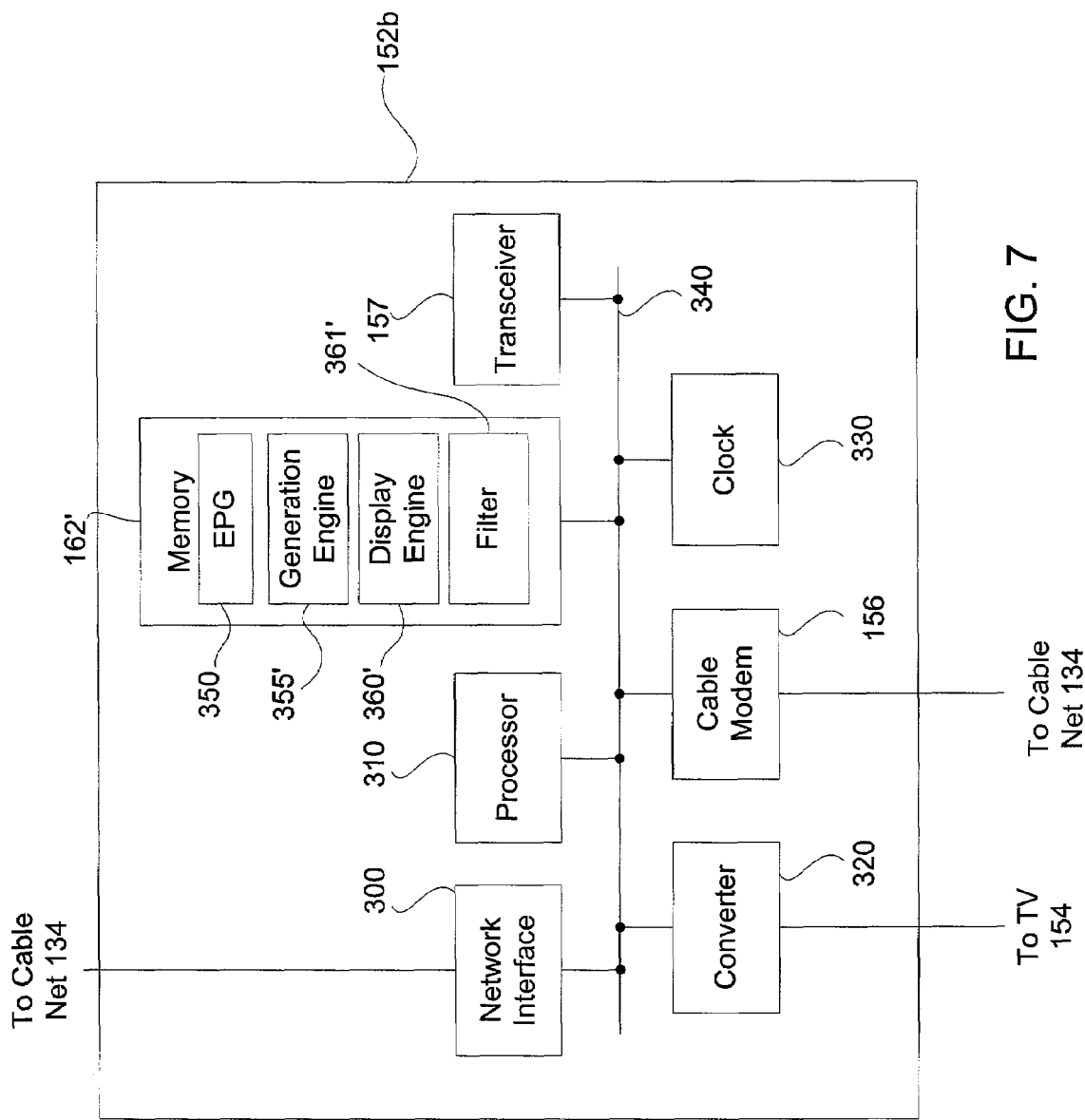
FIG. 7 is a block diagram of an STB according to another embodiment of the invention.

FIG. 7 illustrates a block diagram of another representative set top box according to another embodiment of the invention. In FIG. 7, a STB 152*b* is shown, which includes a network interface 300, a processor 310, a memory device 162' (also referred to as a storage device), a transceiver 157, a converter 320, a cable modem 156, and a clock 330, all interconnected together for communication via system bus 340. In one embodiment, the components of STB 152*b*, except for at least some of the programs in the memory device 162', may be substantially similar to corresponding components in STB 152*a*. Network interface 300 and/or cable modem 156 enable STB 152*b* to communicate with a server 800 (FIG. 8). Memory device 162' includes an EPG 350, a generation engine 355', a display engine 360', and filter 361'. EPG 350 is an electronic program guide that can display TV scheduling information on TV 154, for example. Generation engine 355' forwards channel viewing data to a remote server 800 for storage and processing an automatic personalized channel favorites table for a television 154 viewer. As an example, the remote server 800 may be controlled by the provider 108. As another example, the remote server may be a type of storage device or server that is external to the STB 152b. Display engine 360' communicates with the remote server 800 to receive a user's personalized favorites channel table that is stored in remote server 800 and displayed on television 154. The filter 361' performs a filtering function as similarly described above. Generation engine 355' and display engine 360' will be discussed in further detail in conjunction with FIG. 9 and FIG. 11 respectively.

FIG. 8 illustrates a block diagram of a remote server 800 for use with the set top box 152b illustrated by FIG. 7 in an embodiment according to the present invention. The server 800 includes a network interface 810; a processor 820; a memory device 830; and a cable modem 840, which are interconnected for communication by system bus 850. Network interface 810 and/or cable modem 840 connects the server 800 to the cable network 134 (FIG. 1), thus enabling server 800 to communicate with, for example, the STB 152b (FIG. 7). In alternative embodiments, the cable modem 840 may provide some or all of the functionality of the network interface 810, and thus, the network interface 810 may be omitted. In other embodiments, the network interface 300 may also provide some or all of the functionalities of cable modem 840, and as a result, cable modem 840 is omitted in these other embodiments. Processor 820 executes instructions stored in memory 830, specifically, server generation engine 822, which generates a channel favorites table, and server display engine 824, which sends channel favorites display information to STB 152b for display on TV 154 (FIG. 1).

Memory 830 stores the server generation engine 822, the server display engine 824 and favorites tables 826. In one embodiment in accordance with the invention, the server generation engine 822 generates a channel favorites table, which is stored in the favorites tables 826, based on a viewer changing channels using the EPG 350 of STB 152b. The server generation engine 822 also updates the channel favorites table in the favorites tables 826 based on the viewer's channel viewing habits using the EPG 350 of STB 152b. An embodiment of the server generation engine 822 will be discussed in further detail in conjunction with FIG. 10.

Server display engine 824, according to one embodiment of the invention, forwards an ordered channel favorites table from favorites tables 826 to STB 152b. The channel favorites table 826 can be displayed using a variety of orderings, according to a viewer's preference. For example, the channel favorites table 826 can be displayed in a numerical channel order, a cumulative viewing time, a frequency of viewing, or other orderings. An embodiment of server display engine 824 will be discussed in further detail in conjunction with FIG. 12.

In another embodiment, the remote server 800 downloads (via by use of processor 820) a hypertext markup language (HTML) link to the STB 152b, and the HTML link is displayed on the television 154. The user can then select the HTML link in order to enable the display on television 154 a channel favorites table 826 that is stored in a memory of remote server 800.

In an embodiment, favorites tables 826 may include one channel favorites table for a single viewer. In an alternative embodiment, the favorites tables 826 may include multiple channel favorites tables, so that multiple viewers from a single STB 152b or multiple viewers from multiple STBs 152b may each have his or her own channel favorites table. Favorites tables 826 are generated and updated by server generation engine 822. Contents of the favorites tables 826 may be forwarded by server display engine 824 to STB 152b for display on TV 154. In one embodiment, favorites tables 826 is substantially similar to favorites table 365 (FIG. 4) except that favorites tables 826 is stored on server 800.

Figure 9:
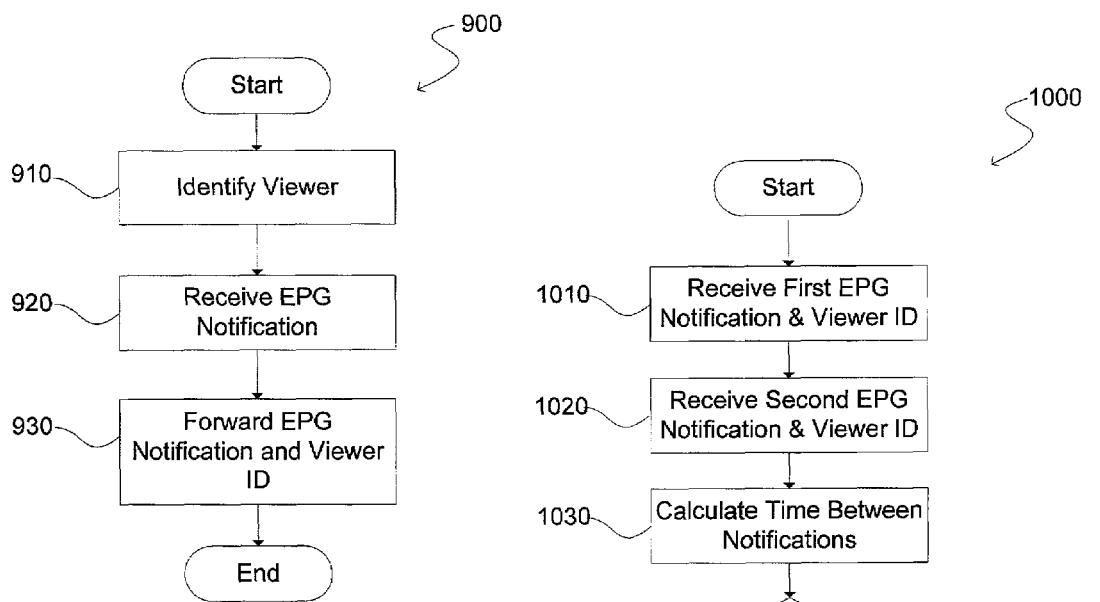
FIG. 9 is a flowchart diagram of a method of detecting and processing a channel change event according to an embodiment of the invention.
Figure 10:
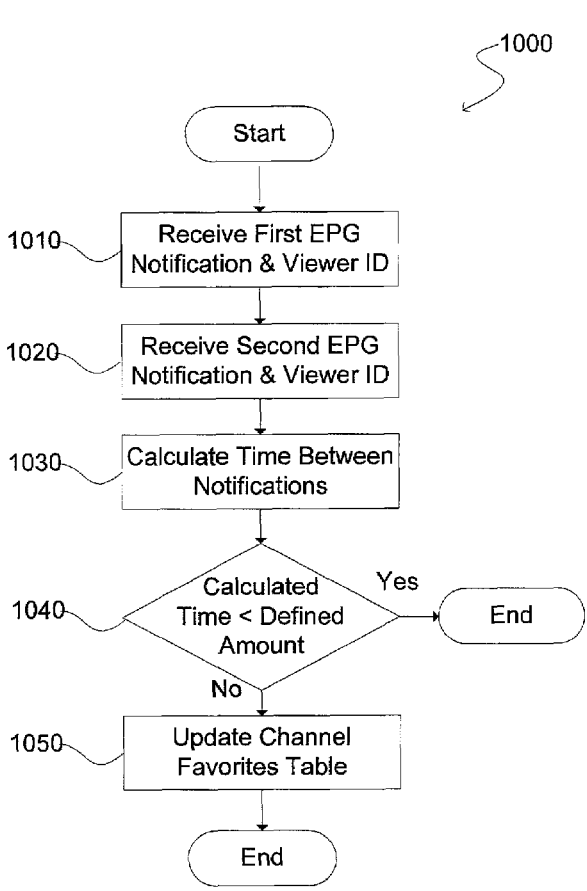
FIG. 10 is a flowchart diagram of a method of generating a channel favorites table according to an embodiment of the invention.

FIG. 9 and FIG. 10 illustrate flowchart diagrams 900 and 1000 respectively of representative processing for generating a channel favorites table. Flowchart diagrams 900 and 1000 illustrate processing that can generally occur continuously or at repeated intervals. In one embodiment, the processing illustrated by flowchart diagram 900 can be implemented by generation engine 355' of FIG. 7. In flowchart diagram 900, a viewer of, for example, TV 154 is identified (910) by prompting the viewer for an identification token, such as a name or ID number. Next, an channel activity notification, such as an EPG notification from, for example, EPG 350 is received (920) by, for example, generation engine 355'. The notification indicates that a channel activity has occurred on STB 152b, such as a viewer selecting and/or viewing a new channel. Generally, the notification includes the new channel and the time of the change to the new channel, as indicated by, for example, clock 330. The notification and viewer ID are then forwarded to a storage device, such as remote server 800, for processing by, for example, server generation engine 822.

The processing illustrated by flowchart diagram 1000 can be implemented by, for example, server generation engine 822 of server 800. In flowchart diagram 1000, a first notification and viewer ID is received (1010) from STB 152b. A second notification and viewer ID is then received (1020) from STB 152b. The difference between the first and second notifications is then calculated (1030) by subtracting the time value in the first EPG notification from the time value in the second EPG notification. If the calculated time difference is less than a defined amount, then the notifications are eliminated (1040), i.e., ignored, and the processing illustrated by flowchart diagram 1000 completes. If the calculated time difference is greater than the defined amount, then the channels favorite table 826 is updated (1050). In an embodiment, updating the table 826 includes one or more of storing a channel name, a channel number, a time the channel was viewed, and incrementing a counter indicating the number of times the channel was viewed. Alternatively, if the channel is already in the favorites table 826, then the table 826 is updated by adding the amount of time the channel was viewed to the cumulative time that the channel has been viewed and incrementing the frequency counter for the channel by one. While the processing illustrated by flowchart diagrams 900 and 1000 has been described with reference to a single viewer, the processing of flowchart diagram 900 may be implemented so as to proceed concurrently among multiple STBs 152b. Further, the processing illustrated by flowchart diagram 1000 may be executed continuously or at repeated intervals to receive data from multiple STBs 152b.

Figure 11:
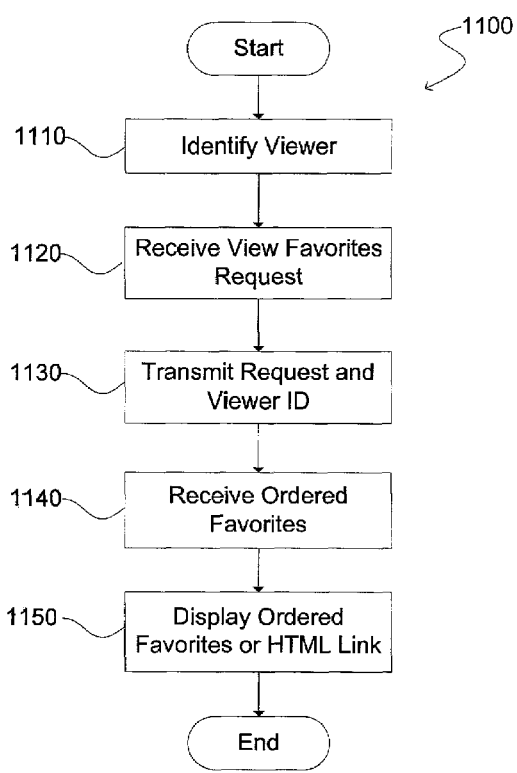
FIG. 11 is a flowchart diagram of a method of displaying a channel favorites table according to another embodiment of the invention.
Figure 12:
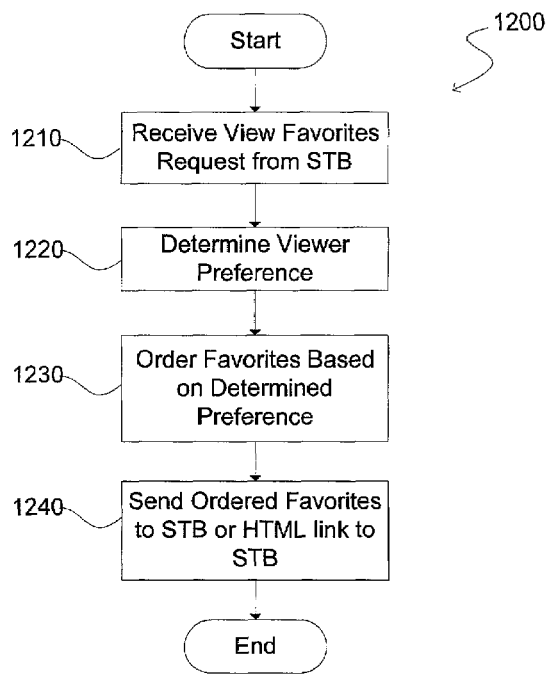
FIG. 12 is a flowchart diagram of a method for displaying a channel favorites table according to another embodiment of the invention.

FIG. 11 and FIG. 12 are flowchart diagrams of methods 1100 and 1200 of representative processing for displaying a channel favorites table in an embodiment of the invention. In one embodiment, processing illustrated by flowchart diagram 1100 can be implemented by display engine 360' (FIG. 7). In flowchart diagram 1100 (which in an embodiment runs continuously or repetitively at selected intervals), a viewer is first identified (1110) by prompting the viewer for his or her name or other identification token. Next, a view favorites request is received (1120) from STB 152b (FIG. 7). The view favorites request and viewer ID is then transmitted (1130) to a remote server for processing, such as, for example, the server 800 which may be at provider 108. In response, ordered favorites are received (1140) from, for example, the remote server 800. The ordered favorites can then be displayed (1150) on, for example, TV 154, and the processing illustrated by FIG. 11 is completed. In another embodiment, instead of displaying the ordered favorites table, an HTML link is displayed on the television 154. If the user selects the displayed HTML link, then the ordered favorites table (which are associated with the HTML link) is displayed.

In one embodiment of the invention, server display engine 824 of server 800 performs processing illustrated by flowchart diagram 1200 of FIG. 12. As shown by FIG. 12, a view favorites request is received (1210). In one embodiment, the request can come from STB 152*b* (see block 1130 in FIG. 11). The request includes a viewer ID that identifies the viewer making the request. The ordered favorites display preference is then determined (1220) by looking up the viewer's table in favorites tables 826. The channels in the viewer's table are then ordered (1230) according to the viewer's preference. The ordered favorites are then sent (1240) to the viewer's STB 152*b*, where the favorites can be displayed on, for example, TV 154 (FIG. 1). In another embodiment, instead of displaying the ordered favorites table, an HTML link is displayed on television 154. If the user selects the displayed HTML link, then the ordered favorites table associated with the HTML link is displayed.

Figure 13:
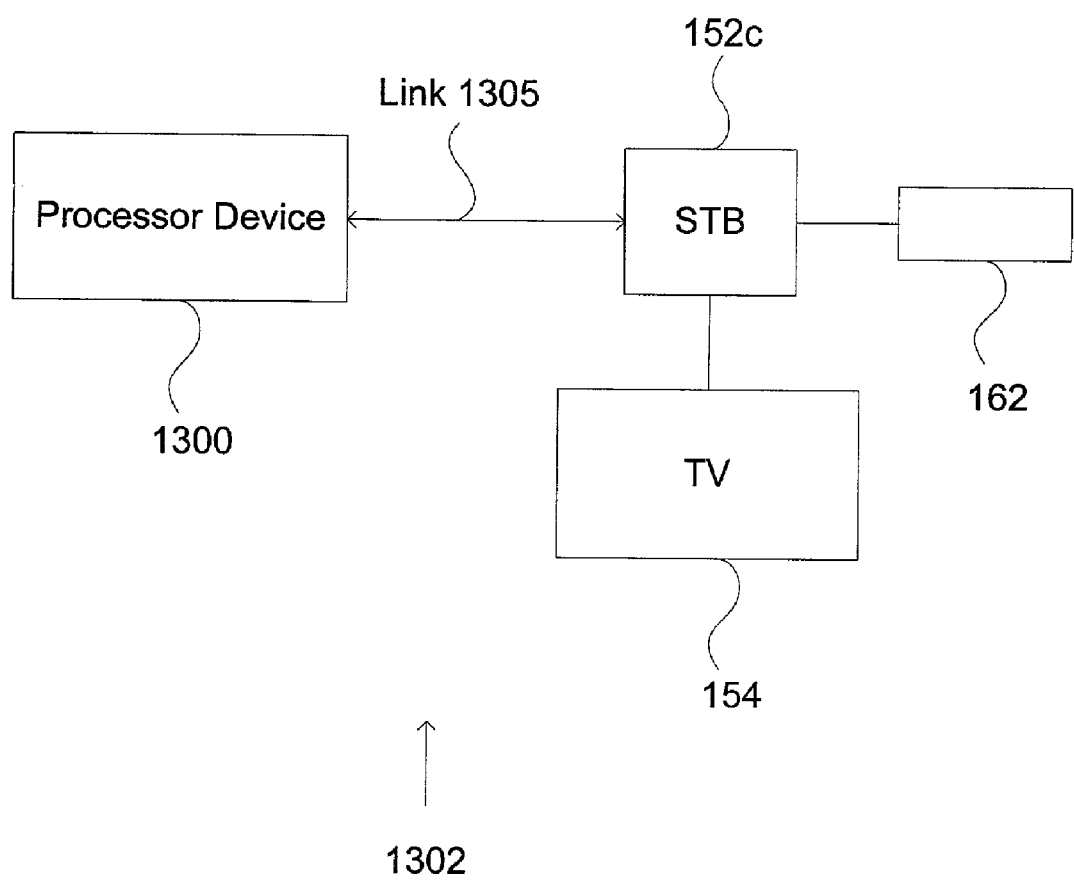
FIG. 13 is a block diagram of another system for programming a channel favorites table according to another embodiment of the invention.

FIG. 13 is a block diagram of a system 1302 for processing and displaying a channel favorites table according to another embodiment of the invention. The STB 152*c* can detect channel change events as similarly described above and transmit (via link 1305) channel viewing data (relating to the channel change events) to a processor device 1300 for storage and processing of an automatic personalized channel favorites table for a television 154 viewer. In one embodiment, a filter engine in the STB 152*c* can filter channel change events so that channel viewing data relating to selected channel change events are transmitted to the processor device 1300 for storage and processing. The processor device 1300 can transmit a channel favorites table to the STB 152*c* for display on television 154. The viewer can then select the channels in the channel favorites table.

The processor device 1300 may be, for example, a personal computer, a notebook computer, a web pad, or other suitable processing devices. The link 1305 may be a wireless connection or a wired connection such as a portion of a Local Area Network (LAN). If the link 1305 is a wireless connection, then a suitable wireless protocol may be used to transmit data between the STB 152*c* and processor device 1300. One example of a suitable wireless protocol is the Bluetooth wireless protocol.

Figure 14:
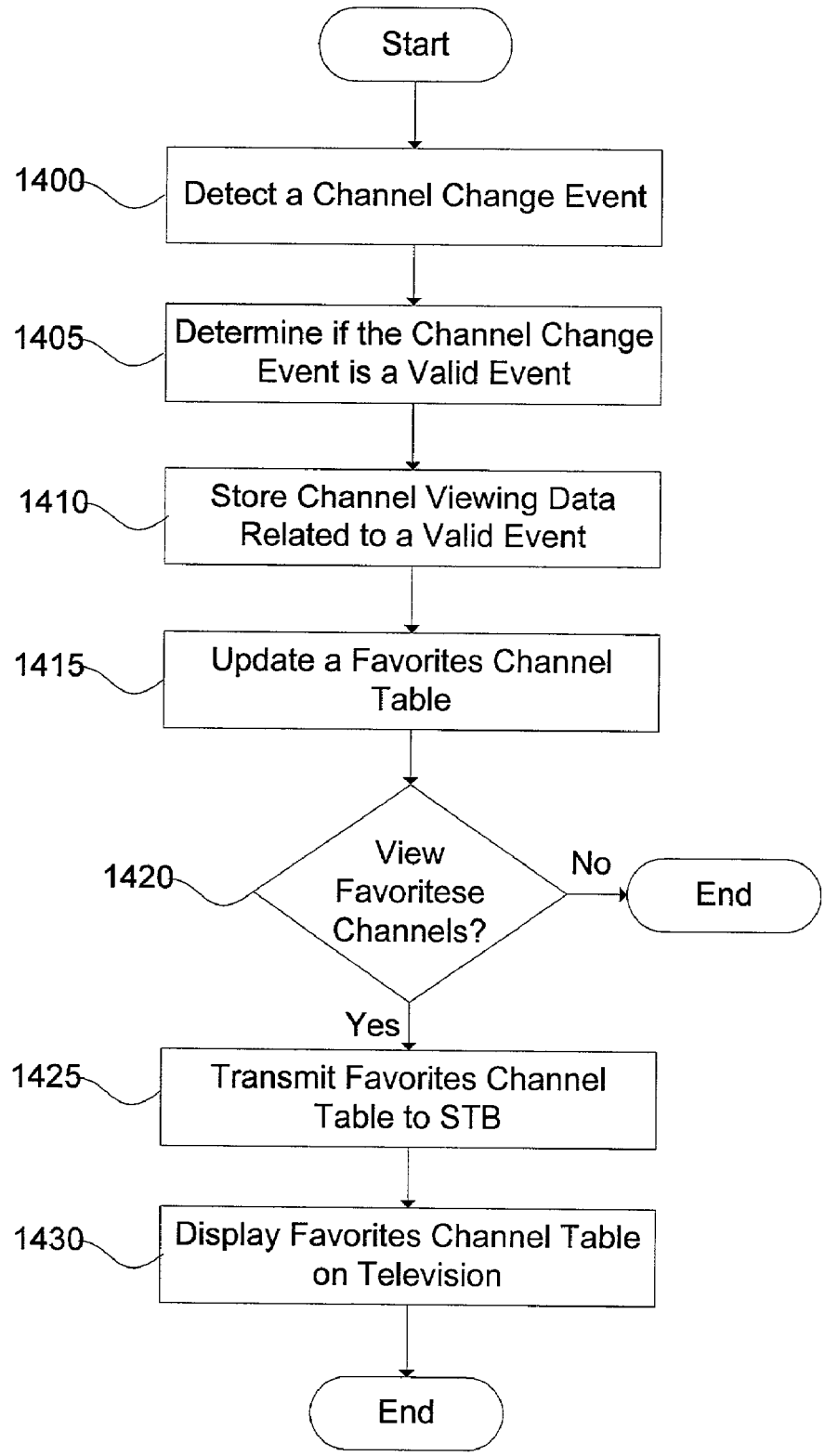
FIG. 14 is a flowchart diagram of a method of generating a channel favorites table according to another embodiment of the invention.

FIG. 14 is a flowchart diagram of a method of processing a favorites table according to another embodiment of the invention. A channel change event is first detected (1400) by, for example, the STB 152*c* (FIG. 13). It is then determined (1405) if the channel change event is a valid event. If the channel change event is a valid event, then channel viewing data related to the valid event is stored (1410) in, for example, the processor device 1300. A channel favorites table in, for example, memory of the processor device 1300 is then updated (1415) based on the channel viewing data.

Assume that the user decides (1420) whether or not to view a favorites channel on, for example, television 154 (FIG. 13). If not, then the method illustrated in FIG. 14 ends. If, on the other hand, the user decides to view a favorites channel, then a favorites channel table is transmitted (1425) transmitted to, for example, the STB 152*c*. The favorites channel table is then displayed (1430) on, for example, the television 154, and the user can select a channel listed in the favorites channel table.

Other variations and modifications of the above-described embodiments and methods are possible in light of the foregoing teaching. For example, generation engine 355' in STB 152*b* may be implemented with a hardware architecture instead of with software. As another example, the television 154 in the drawings may be replaced by a computer with program or video display capability. Further, the systems and methods described above may be used for video-casting, which may include broadcasting, demand-casting, multicasting, uni-casting, and other various technologies. Further, at least some of the components of this invention may be implemented by using a programmed general purpose digital computer, by using application specific integrated circuits, or by using a network of interconnected components and circuits. Connections may be wired, wireless, by modem, and the like.

It is also within the scope of the present invention to implement a program or code that can be stored in an electronically-readable medium to permit a computer to perform any of the methods described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for generating a list of channel favorites in an interactive television system, comprising:
    receiving a first notification, the first notification indicating a first channel activity;
    receiving a second notification, the second notification indicating a second channel activity;
    calculating a time difference between the first and the second notifications; and
    updating a channel favorites table based on the calculated time difference, wherein the favorites tables includes a display preference field that comprises a user-selected option to define an order in which the channel favorites are displayed, wherein the display preference field allows a user to select between at least an order based on a cumulative viewing time per channel and an order based on a number of times each favorite channel is viewed.

2. The method of claim 1, wherein the updating includes adding the calculated time difference to a first channel cumulative time field in the favorites table.

3. The method of claim 1, wherein the updating further includes incrementing a counter in a first channel view frequency field of the favorites table.

4. The method of claim 1, further comprising displaying a list of channels from the channel favorites table.

5. The method of claim 4, wherein the list of channels is displayed according to said field.

6. The method of claim 1, further comprising identifying a viewer of the interactive television system.

7. The method of claim 1, wherein the first and second notifications are electronic program guide notifications received from an electronic program guide.

8. The method of claim 1, wherein the first and second activities include selecting a first and second channel, respectively.

9. The method of claim 1, wherein the first and second activities include viewing a first and second channel, respectively.

10. The method of claim 1, wherein the display preference field further allows the user to select an order based on a numerical order by channel number.

11. An apparatus for creating favorite channels in interactive television system, comprising:
 means for receiving a first notification, the first notification indicating a first channel activity;
 communicatively coupled to the means for receiving the first notification, means for receiving a second notification, the second notification indicating a second channel activity;
 communicatively coupled to the means for receiving the second notification, means for calculating a time difference between the first and the second notifications; and
 communicatively coupled to the calculating means, means for updating a channel favorites table based on the calculated time difference wherein the channel favorites tables includes a display preference field that comprises a user-selected option to define an order in which the favorite channels are displayed, wherein the display preference field allows a user to select between at least an order based on a cumulative viewing time per channel and an order based on a number of times each favorite channel is viewed.

12. An apparatus for generating favorite channels in an interactive television system, comprising:
 a channel favorites table capable to store channel favorites of a viewer, wherein the channel favorites table is further capable to store a display preference field that comprises the viewer's preference for an order in which the channel favorites are displayed, wherein the display preference field allows a user to select between at least an order based on a cumulative viewing time per channel and an order based on a number of times each favorite channel is viewed;
 a generation engine communicatively coupled to the channel favorites table and capable to receive a notification, the notification indicating a channel activity, the generation engine further capable to calculate a time difference between receipt of notifications and to update the channel favorites table based on the calculated time difference; and
 a display engine communicatively coupled to the channel favorites table and capable to display contents of the channel favorites table.

13. The apparatus of claim 12, wherein the display engine is capable to display contents of the channel favorites table according to the said field.

14. The apparatus of claim 12, wherein the generation engine and display engine are further capable to identify the viewer.

15. The apparatus of claim 12, wherein the generation engine is further capable to filter channel changes based on the calculated time difference.

16. The apparatus of claim 12, wherein the notifications are electronic program guide notifications received from an electronic program guide.

17. The apparatus of claim 12, wherein the channel activity includes selecting a channel.

18. The apparatus of claim 12, wherein the channel activity includes viewing a channel.

19. The apparatus of claim 12, wherein the display preference field further allows the user to select an order based on a numerical order by channel number.

* * * * *